(12) United States Patent
Tsirkin

(10) Patent No.: US 9,778,945 B2
(45) Date of Patent: Oct. 3, 2017

(54) PROVIDING MODE-DEPENDENT VIRTUAL MACHINE FUNCTION CODE

(71) Applicant: Red Hat Israel, Ltd., Raanana (IL)

(72) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 129 days.

(21) Appl. No.: 14/618,268

(22) Filed: Feb. 10, 2015

(65) Prior Publication Data
US 2016/0232020 A1    Aug. 11, 2016

(51) Int. Cl.
G06F 9/455    (2006.01)

(52) U.S. Cl.
CPC ................. G06F 9/45545 (2013.01)

(58) Field of Classification Search
None
See application file for complete search history.

(56) References Cited

U.S. PATENT DOCUMENTS

| | | | |
|---|---|---|---|
| 5,129,070 A * | 7/1992 | Dorotte | G06F 12/109 711/2 |
| 6,766,366 B1 | 7/2004 | Schafer et al. | |
| 7,401,178 B1 * | 7/2008 | Tene | G06F 9/45537 711/2 |
| 7,945,436 B2 | 5/2011 | Ang et al. | |
| 8,024,730 B2 | 9/2011 | Campbell et al. | |
| 8,510,725 B2 | 8/2013 | Frost | |
| 8,510,756 B1 | 8/2013 | Koryakin et al. | |
| 8,656,482 B1 | 2/2014 | Tosa et al. | |
| 2013/0117743 A1 * | 5/2013 | Neiger | G06F 9/455 718/1 |
| 2014/0025795 A1 | 1/2014 | Fiennes | |
| 2014/0189690 A1 | 7/2014 | Ramakirshnan | |
| 2014/0281040 A1 | 9/2014 | Liu | |
| 2015/0006717 A1 * | 1/2015 | Schmitt | G06F 11/3636 709/224 |
| 2015/0178085 A1 * | 6/2015 | Hertzberg | G06F 9/30189 712/222 |
| 2015/0277867 A1 * | 10/2015 | Hasabnis | G06F 8/433 717/164 |
| 2015/0370628 A1 * | 12/2015 | Zmudzinski | G06F 11/1016 711/133 |

(Continued)

OTHER PUBLICATIONS

Li, Yanlin et al., "MiniBox: A Two-Way Sandbox for x86 Native Code", CyLab, Carnegie Mellon University, Pittsburgh, PA, Feb. 21, 2014 18 Pages http://repository.cmu.edu/cgi/viewcontent.cgi?article=1123&context=cylab.

(Continued)

Primary Examiner — Dong Kim
(74) Attorney, Agent, or Firm — Lowenstein Sandler LLP

(57) ABSTRACT

Systems and methods for providing mode-dependent virtual machine (VM) function code. An example method may comprise: detecting, by a hypervisor executing by a processing device of a host computer system, a transition to a first execution mode by a guest operating system (OS) executing on the host computer system, wherein the first execution mode is characterized by at least one of: a first physical address size or a first general purpose register size; and responsive to the detecting, enabling a virtual machine (VM) function to be executed by the guest OS in the first execution mode.

17 Claims, 4 Drawing Sheets

(56) References Cited

U.S. PATENT DOCUMENTS

| | | | |
|---|---|---|---|
| 2016/0048464 A1* | 2/2016 | Nakajima | G06F 12/1475 711/152 |
| 2016/0179696 A1* | 6/2016 | Zmudzinski | G06F 12/1009 711/163 |
| 2016/0188354 A1* | 6/2016 | Goldsmith | G06F 9/45558 718/1 |

OTHER PUBLICATIONS

Mulnix, David, "Intel Atom Processor C2000 Product Family Technical Overview", Intel Corporation, Sep. 23, 2013, 12 Pages https://software.intel.com/en-us/articles/intel-atom-c2000-processor-family-technical-overview.

Nakajima, Jun, et al., "Extending KVM Models Toward High-Performance NFV", Intel Corporation, Oct. 14, 2014 28 Pages http://www.linux-kvm.org/wiki/images/1/1d/01x05-NFV.pdf.

* cited by examiner

PROVIDING MODE-DEPENDENT VIRTUAL MACHINE FUNCTION CODE

TECHNICAL FIELD

The present disclosure is generally related to virtualized computer systems, and is more specifically related to systems and methods for providing mode-dependent virtual machine function code.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
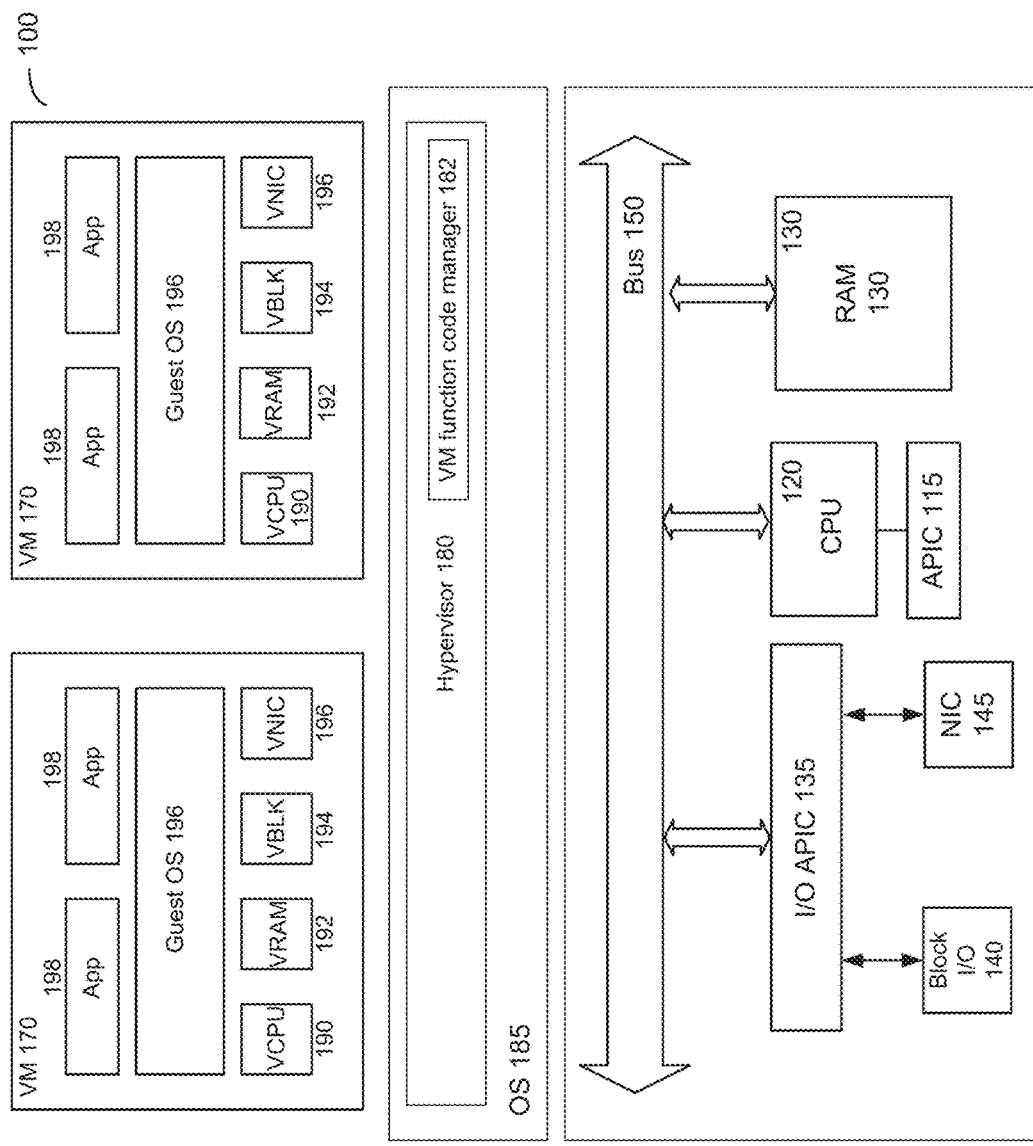
FIG. 1 depicts a high-level component diagram of an example computer system configured to implement the methods described herein, in accordance with one or more aspects of the present disclosure.

Described herein are methods and systems for providing mode-dependent virtual machine (VM) function code.

Certain processor architectures support virtualization by providing special instructions for facilitating virtual machine execution. In certain implementations, a processor may support executing a virtual machine monitor (VMM) that acts as a host and has full control of the processor and other platform hardware. A VMM presents a virtual machine with an abstraction of one or more virtual processors. A VMM is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the VMM can retain control of platform resources. A transition from the reduced privilege level (also referred to as VMX non-root operation in certain processor architectures) to the VMM context is referred to as a VM exit and may be performed by invoking a special Instruction Set Architecture (ISA)-dependent instruction (e.g., VMEXIT).

A VM function is a privileged processor operation that can be invoked by a virtual machine without performing a VM exit. VM functions may be enabled and configured by the settings of certain fields in the Virtual Machine Control Structure (VMCS). A virtual machine may invoke a VM function by using a special ISA-dependent instruction (e.g., VMFUNC). A certain processor register (e.g., EAX) may be employed to select the specific VM function being invoked. As the VM function code may run with elevated privileges, it may access, e.g., the hypervisor memory or memory of other VMs.

Certain processor architectures also support different execution modes (e.g., characterized by the physical address size and/or the general purpose register size). In an illustrative example, a processor may support 32-bit and 64-bit execution modes, although other execution modes are also within the scope of the present disclosure.

The 32-bit execution mode enables a 32-bit operating system to run applications accessing 32-bit linear address space. The 64-bit execution mode enables a 64-bit operating system to run applications accessing the 64-bit linear address space. The 64-bit execution mode may be enabled by the operating system on a code-segment basis. The default address size is 64 bits and its default operand size is 32 bits. The default operand size can be overridden on an instruction-by-instruction basis using a certain opcode prefix (e.g., REX prefix allowing a 64-bit operand to be specified when operating in the 64-bit mode).

Certain processor architectures also support additional execution modes, such as the Physical Address Extension (PAE) mode that enables translation of 32-bit linear addresses to 52-bit physical addresses.

Running VM functions in the 32-bit execution mode may present certain challenges, such as the ability of a malicious guest to modify guest virtual addresses to guest physical addresses on the fly at arbitrary byte boundaries. Furthermore, in the 32-bit execution mode, PAE registers are not managed by the hardware on the VM function entry. Also, in the 32-bit execution mode, the interrupt handlers are not guaranteed to save the registers on the stack, thus potentially creating problems with restoring the context upon exiting.

In addition to overcoming at least some of the above noted challenges related to the 32-bit execution mode, the 64-bit execution mode provides additional general purpose registers thus further improving the system efficiency. However, as the guest software may switch between the execution modes, the hypervisor may not assume that the VM function that is invoked by a guest would be executed in the 64-bit mode.

Aspects of the present disclosure address the above noted and other deficiencies by providing methods and systems for providing mode-dependent VM function code. In accordance with one or more aspects of the present disclosure, the hypervisor may, upon detecting the guest operating system transitioning to the 64-bit execution mode, enable a VM function to be executed by the guest OS in the 64-bit execution mode. In an illustrative example, the hypervisor may enable a VM function to be executed in the 64-bit execution mode by writing a 64-bit code into the memory buffer referenced by an entry point of the VM function. In another illustrative example, the hypervisor may enable a VM function to be executed in the 64-bit execution mode by modifying an Extended Page Table (EPT) mapping to associate an entry point of the VM function with a 64-bit code fragment. In yet another illustrative example, the hypervisor may enable a VM function to be executed in the 64-bit execution mode by modifying an EPT mapping to allow writing into a privileged hypervisor memory by the VM function. Upon enabling the VM function to be executed in the 64-bit execution mode, the hypervisor may notify the guest of availability of the VM function.

In certain implementations, the hypervisor may, upon detecting the guest operating system transitioning to the 32-bit execution mode, enable a VM function to be executed by the guest OS in the 32-bit execution mode. In an illustrative example, the hypervisor may enable a VM function to be executed in the 32-bit execution mode by writing a 32-bit code into the memory buffer referenced by the VM function entry point. In another illustrative example, the hypervisor may enable a VM function to be executed in the 32-bit execution mode by modifying an EPT mapping to associate the VM function entry point with a 32-bit code fragment. Upon enabling the VM function to be executed in the 32-bit execution mode, the hypervisor may notify the guest of availability of the VM function.

Alternatively, the hypervisor may, upon detecting the guest operating system transitioning to the 32-bit execution mode, disable execution of the VM function. In an illustrative example, the hypervisor may disable a VM function by writing a code that aborts execution of the VM function into the memory buffer referenced by the VM function entry point. In another illustrative example, the hypervisor may disable a VM function by modifying an EPT mapping to associate the VM function entry point with a code module that aborts execution of the VM function. In yet another illustrative example, the hypervisor may disable a VM function by modifying an EPT mapping to disable writing into a privileged hypervisor memory by the VM function. In yet another illustrative example, the hypervisor may disable a VM function by disabling the EPT mapping associated with the VM function entry point. Upon disabling the VM function to be executed in the 64-bit execution mode, the hypervisor may notify the guest of unavailability of the VM function.

Various aspects of the above referenced methods and systems are described in details herein below by way of examples, rather than by way of limitation.

FIG. 1 depicts a high-level component diagram of an illustrative example of a computer system 100 in accordance with one or more aspects of the present disclosure. Computer system 100 may include one or more processors 120 communicatively coupled to memory devices 130 and input/output (I/O) devices 140, 145 via a system bus 150.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. In an illustrative example, an I/O device may be provided by a network interface controller (NIC) 145 or a block I/O device, such as disk 140.

Computer system 100 may further comprise one or more Advanced Programmable Interrupt Controllers (APIC), including one local APIC 115 per processor and one or more I/O APICs 135. Local APIC 115 may receive interrupts from local sources (including timer interrupts, internal error interrupts, performance monitoring counter interrupts, thermal sensor interrupts, and I/O devices connected to the processor's local interrupt pins either directly or via an external interrupt controller) and externally connected I/O devices (i.e., I/O devices connected to an I/O APIC), as well as inter-processor interrupts (IPIs).

Computer system 100 may run multiple virtual machines 170, by executing a software layer 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170 as virtual devices. A virtual machine 170 may execute a guest operating system 196 which may utilize underlying virtual processors (also referred to as virtual central processing units (vCPUs)) 190, virtual memory 192, and virtual I/O devices 194, 196. One or more applications 198 may be running on a virtual machine 170 under guest operating system 196.

The address space virtualization may be implemented by the paging mechanism designed to support a virtual memory environment where a virtual machine address space is simulated with a smaller amount of random access memory (RAM) and a backing store (e.g., a disk). The memory may be divided into pages of a defined size (e.g., 4 KB). The guest operating system may maintain a page directory and a set of page tables to keep track of the pages. When a virtual machine attempts to access a memory page, it may use the page directory and page tables to translate the virtual address into a physical address. If the page being accessed is not currently in the physical memory, a page-fault exception may be generated, responsive to which the virtual machine may read the page from the backing store and continue executing the thread.

In certain implementations, host computer system 100 may implement second-level address translation mechanism to facilitate virtual machine (guest) to host address translations. In an illustrative example, guest applications 198 may reference memory locations using guest virtual addresses (e.g., represented by guest linear addresses). Responsive to receiving a memory access request, the processor may translate the referenced guest virtual address to a guest physical address using a guest page table that is managed by the guest operating system. The processor may then translate the guest physical address to the corresponding host physical address using an extended page table (EPT) that is managed by the hypervisor.

Processor 120 may support virtualization by providing special instructions for facilitating virtual machine execution, including one or more instructions facilitating execution of VM functions. A VM function is a privileged processor operation that can be invoked by a virtual machine without performing a VM exit. A virtual machine may invoke a VM function by using a special ISA-dependent instruction (e.g., VMFUNC). In certain processor architectures, a pre-defined processor register (e.g., EAX) may be employed to select a specific VM function being invoked. As the VM function code may run with elevated privileges, it may access, e.g., the hypervisor memory or memory of other VMs.

Processor 120 may also support different execution modes (e.g., characterized by the physical address size and/or the general purpose register size). In an illustrative example, processor 120 may support 32-bit and 64-bit execution modes. In certain implementations, processor 120 may further support additional execution modes, such as the PAE mode that enables translation of 32-bit linear addresses to 52-bit physical addresses. Other execution modes (e.g., characterized by the physical address size and/or the general purpose register size) are also within the scope of the present disclosure.

In accordance with one or more aspects of the present disclosure, hypervisor 180 may include a VM function code management component 182 which may provide execution mode-dependent VM function code, as described in more details herein below with reference to FIGS. 2-3.

In certain implementations, VM function code management component 182 may be implemented as a software component invoked by hypervisor 180, and may comprise one or more code modules that implement method 300 described herein below and various auxiliary functions. Alternatively, functions of VM function code management component 182 may be performed by hypervisor 180.

Figure 2:
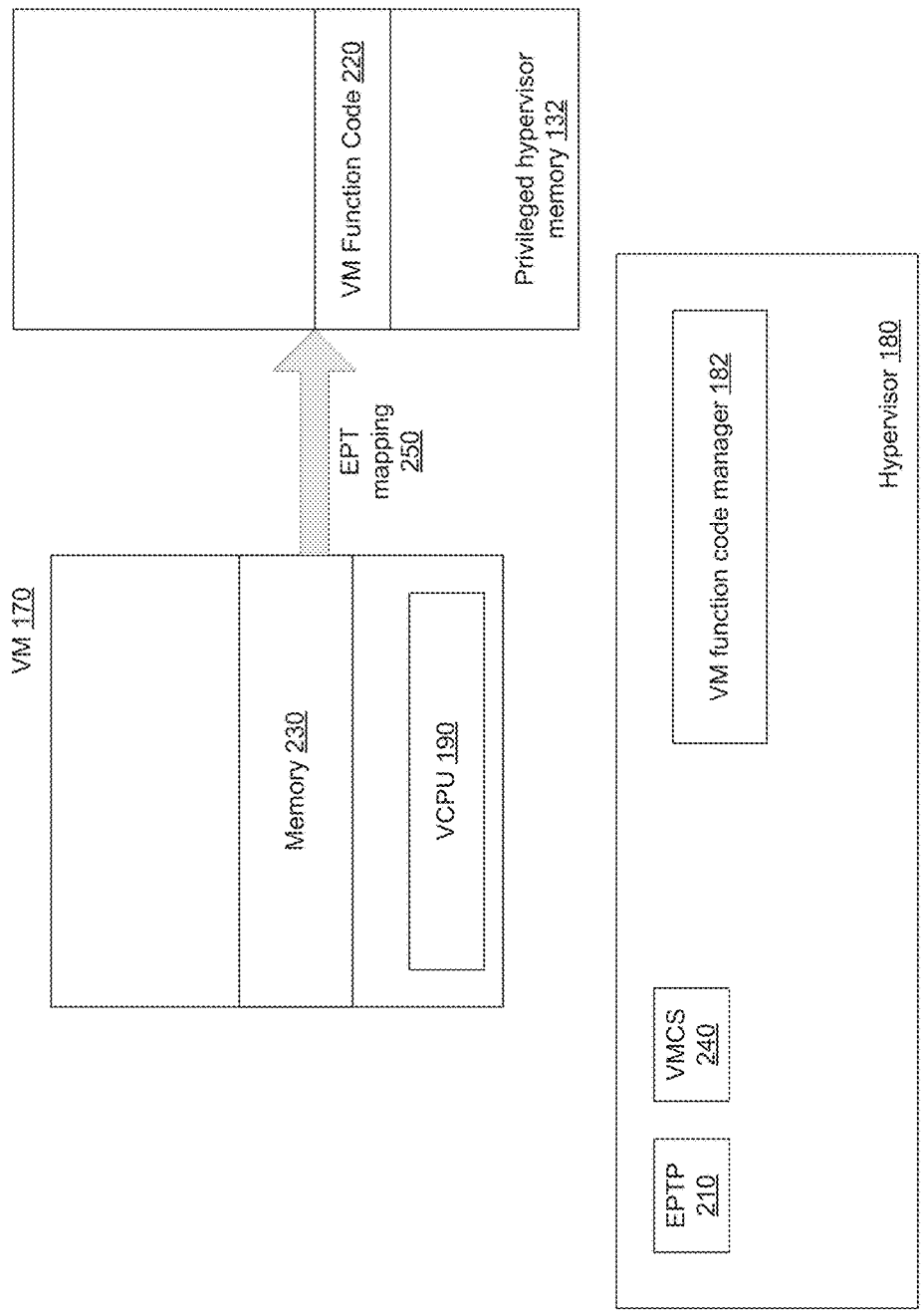
FIG. 2 schematically illustrates an example of providing mode-dependent virtual machine (VM) function code, in accordance with one or more aspects of the present disclosure.

FIG. 2 schematically illustrates an example of providing mode-dependent virtual machine (VM) function code, in accordance with one or more aspects of the present disclosure. VM function code management component 182 may be programmed to detect the execution mode transitions by the guest operating system. Responsive to detecting the guest operating system transitioning to the 64-bit execution mode, VM function code management component 182 may enable a VM function to be executed by the guest OS in the 64-bit execution mode. In an illustrative example, VM function code management component 182 may enable a VM function to be executed in the 64-bit execution mode by writing a 64-bit code into a memory buffer 220 residing within the hypervisor memory 132 and referenced by an entry point of the VM function. In another illustrative example, VM function code management component 182 may enable a VM function to be executed in the 64-bit execution mode by modifying an Extended Page Table (EPT) mapping 250 to associate an entry point of the VM with a 64-bit code fragment. In yet another illustrative example, VM function code management component 182 may enable a VM function to be executed in the 64-bit execution mode by modifying an EPT mapping 250 to allow writing into a privileged hypervisor memory by the VM function. Upon enabling the VM function to be executed in the 64-bit execution mode, the hypervisor may notify the guest of availability of the VM function.

In certain implementations, VM function code management component 182 may, upon detecting the guest operating system transitioning to the 32-bit execution mode, enable a VM function to be executed by the guest OS in the 32-bit execution mode. In an illustrative example, VM function code management component 182 may enable a VM function to be executed in the 32-bit execution mode by writing a 32-bit code into memory buffer 220 residing within the hypervisor memory 132 and referenced by an entry point of the VM function. In another illustrative example, VM function code management component 182 may enable a VM function to be executed in the 32-bit execution mode by modifying an EPT mapping to associate the VM function entry point with a 32-bit code fragment. Upon enabling the VM function to be executed in the 64-bit execution mode, the hypervisor may notify the guest of availability of the VM function.

Alternatively VM function code management component 182 may, upon detecting the guest operating system transitioning to the 32-bit execution mode, disable execution of the VM function. In an illustrative example, VM function code management component 182 may disable a VM function by writing a code that aborts execution of the VM function into the memory buffer referenced by the VM function entry point. In another illustrative example, VM function code management component 182 may disable a VM function by modifying an EPT mapping to associate the VM function entry point with a code module that aborts execution of the VM function. In yet another illustrative example, VM function code management component 182 may disable a VM function by modifying an EPT mapping to disable writing into a privileged hypervisor memory by the VM function. In yet another illustrative example, VM function code management component 182 may disable a VM function by disabling the EPT mapping associated with the VM function entry point. In the latter situation, VM function code 220 is not visible in the main guest view 230. Upon disabling the VM function to be executed in the 64-bit execution mode, the hypervisor may notify the guest of unavailability of the VM function.

Figure 3:
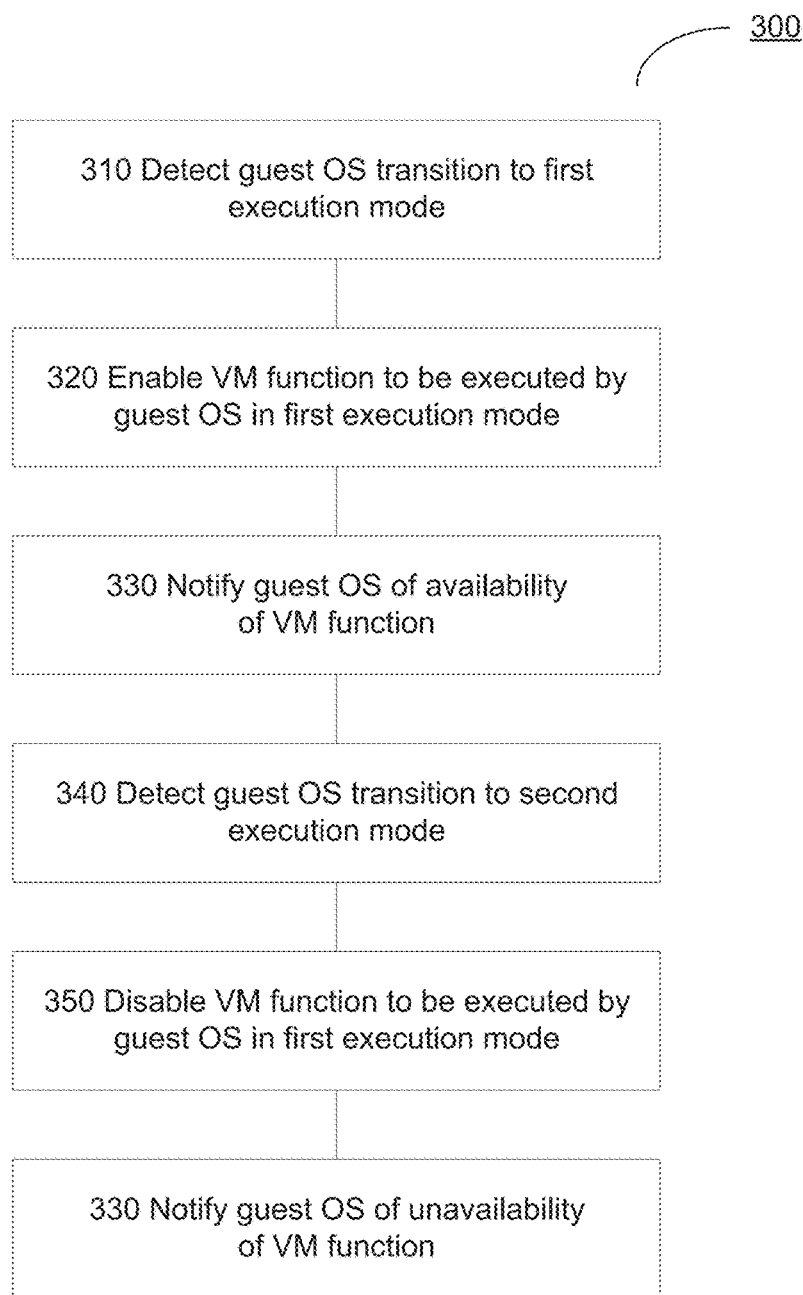
FIG. 3 depicts a flow diagram of a method for providing mode-dependent virtual machine (VM) function code, in accordance with one or more aspects of the present disclosure.

FIG. 3 depicts a flow diagram of one illustrative example of a method 300 for providing mode-dependent VM function code, in accordance with one or more aspects of the present disclosure. Method 300 and/or each of its individual functions, routines, subroutines, or operations may be performed by one or more processing devices of the computer system (e.g., host computer system 100 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a hypervisor being executed by a processing device of a host computer system implementing the method may detect a transition to the first execution mode by a guest operating system (OS) executing on the host computer system. In an illustrative example, the first execution mode may be represented by the 64-bit execution mode. Alternatively, the first execution mode may be represented by the 33-bit execution mode. Alternatively, the first execution mode may be represented by the PAE execution mode. Other execution modes (e.g., characterized by the physical address size and/or by the general purpose register size) are also within the scope of the present disclosure.

At block 320, the hypervisor may enable a VM function to be executed by the guest OS in the first execution mode. In an illustrative example, the hypervisor may enable a VM function to be executed in the 64-bit execution mode by writing a 64-bit code into the memory buffer referenced by an entry point of the VM function. In another illustrative example, the hypervisor may enable a VM function to be executed in the 64-bit execution mode by modifying an Extended Page Table (EPT) mapping to associate an entry point of the VM with a 64-bit code fragment. In yet another illustrative example, the hypervisor may enable a VM function to be executed in the 64-bit execution mode by modifying an EPT mapping to allow writing into a privileged hypervisor memory by the VM function.

At block 330, the hypervisor may notify the guest OS of availability of the VM function.

At block 340, the hypervisor may detect a transition to the second execution mode by the guest operating system (OS) executing on the host computer system. In an illustrative example, the second execution mode may be represented by the 32-bit execution mode.

At block 350, the hypervisor may disable execution of a VM function by the guest OS in the second execution mode. In an illustrative example, the hypervisor may disable a VM function by writing a code that aborts execution of the VM function into the memory buffer referenced by the VM function entry point. In another illustrative example, the hypervisor may disable a VM function by modifying an EPT mapping to associate the VM function entry point with a code module that aborts execution of the VM function. In yet another illustrative example, the hypervisor may disable a VM function by modifying an EPT mapping to disable writing into a privileged hypervisor memory by the VM function. In yet another illustrative example, the hypervisor may disable a VM function by disabling the EPT mapping associated with the VM function entry point. Upon disabling the VM function to be executed in the 64-bit execution mode, the hypervisor may notify the guest of unavailability of the VM function.

At block 360, the hypervisor may notify the guest OS of unavailability of the VM function. Upon completing the operations referenced by block 360, the method may terminate.

Figure 4:
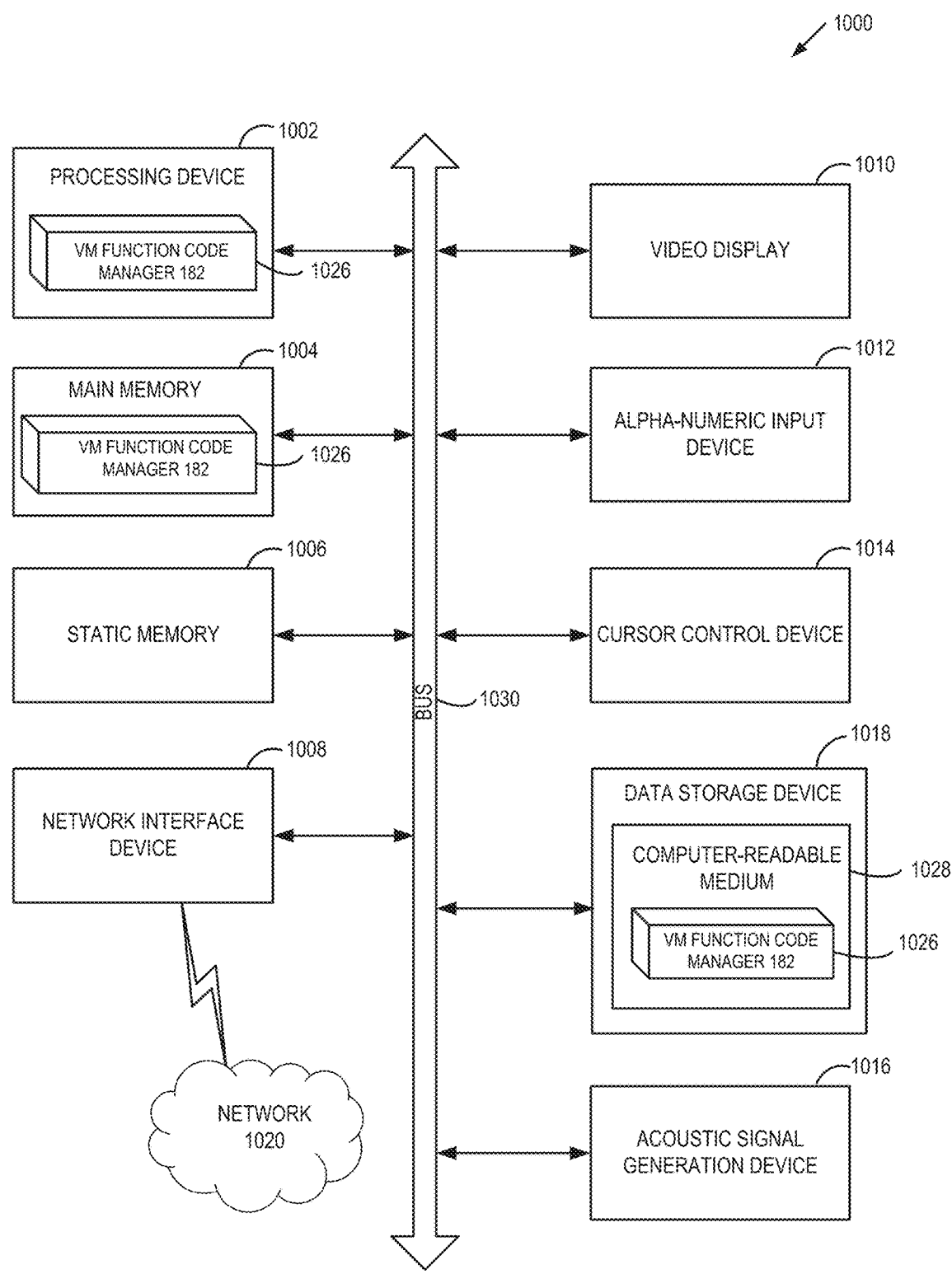
FIG. 4 depicts a block diagram of an example computer system operating in accordance with one or more aspects of the present disclosure.

FIG. 4 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute VM function code management component 182 implementing method 300 for providing mode-dependent VM function code.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of VM function code management component 182 implementing method 300 for providing mode-dependent VM function code.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   detecting, by a processing device executing a hypervisor of a host computer system, a transition from a first execution mode to a second execution mode by a guest operating system (OS) running on the host computer system, wherein the first execution mode is characterized by a first address size, the second execution mode is characterized by a second address size, and the first address size is less than the second address size;
   writing, into a memory buffer referenced by an entry point of a virtual machine (VM) function, a code that is enabled to access an address space defined by the second address size;
   enabling the VM function to be executed by the guest OS in the second execution mode;
   detecting, by the processing device executing the hypervisor, a transition to the first execution mode by the guest OS;
   writing, into the memory buffer referenced by the entry point of the VM function, a code that aborts execution of the VM function; and
   disabling execution of the VM function by the guest OS in the second execution mode.

2. The method of claim 1, wherein enabling the VM function to be executed by the guest OS in the second execution mode comprises at least one of: modifying an Extended Page Table (EPT) mapping to associate the entry point of the VM function with a code module that is enabled to access an address space defined by the second address size, or modifying an Extended Page Table (EPT) mapping to allow writing into a privileged hypervisor memory.

3. The method of claim 1, further comprising:
   notifying the guest OS of availability of the VM function.

4. The method of claim 1, wherein the first execution mode is provided by 32-bit execution mode.

5. The method of claim 1, wherein the second execution mode is provided by 64-bit execution mode.

6. The method of claim 1, further comprising:
   notifying the guest OS of unavailability of the VM function.

7. The method of claim 1, wherein disabling execution of the VM function by the guest OS in the first execution mode comprises at least one of: writing a code to abort execution of the VM function into a memory buffer referenced by the entry point of the VM function, modifying an Extended Page Table (EPT) mapping to associate the entry point of the VM function with a code module that aborts execution of the VM function, modifying an Extended Page Table (EPT) mapping to disable writing into a privileged hypervisor memory, or disabling the EPT mapping associated with the entry point.

8. A system comprising:
   a memory; and
   a processing device, operatively coupled to the memory, to execute a hypervisor to:

detect a transition from a first execution mode to a second execution mode by a guest operating system (OS), wherein the first execution mode is characterized by a first address size, the second execution mode is characterized by a second address size, and the first address size is less than the second address size;

write, into a memory buffer referenced by an entry point of a virtual machine (VM) function, a code that is enabled to access an address space defined by the second address size;

enable the VM function to be executed by the guest OS in the second execution mode;

detect a transition to the first execution mode by the guest OS;

write, into the memory buffer referenced by the entry point of the VM function, a code that aborts execution of the VM function; and disable execution of the VM function by the guest OS in the second execution mode.

9. The system of claim 8, wherein to enable the VM function to be executed by the guest OS in the first execution mode, the processing device is further to perform at least one of: modifying an Extended Page Table (EPT) mapping to associate the entry point of the VM function with a code module that is enabled to access an address space defined by the second address size, or modifying an Extended Page Table (EPT) mapping to allow writing into a privileged hypervisor memory.

10. The system of claim 8, wherein the processing device is further to:
notify the guest OS of availability of the VM function.

11. The system of claim 8, wherein the first execution mode is provided by 32-bit execution mode.

12. The system of claim 8, wherein the second execution mode is provided by 64-bit execution mode.

13. The system of claim 8, wherein the processing device is further to:
notify the guest OS of unavailability of the VM function.

14. The system of claim 8, wherein to disable execution of the VM function by the guest OS in the second execution mode, the processing device is further to perform at least one of: writing a code to abort execution of the VM function into a memory buffer referenced by the entry point of the VM function, modifying an Extended Page Table (EPT) mapping to associate the entry point of the VM function with a code module that aborts execution of the VM function, modifying an Extended Page Table (EPT) mapping to disable writing into a privileged hypervisor memory, or disabling the EPT mapping associated with the entry point.

15. A computer-readable non-transitory storage medium comprising executable instructions that, when executed by a processing device, cause the processing device to:
detect, by the processing device executing a hypervisor, a transition from a first execution mode to a second execution mode by a guest operating system (OS), wherein the first execution mode is characterized by a first address size, the second execution mode is characterized by a second address size, and the first address size is less than the second address size;

write, into a memory buffer referenced by an entry point of a virtual machine (VM) function, a code that is enabled to access an address space defined by the second address size;

enable the VM function to be executed by the guest OS in the second execution mode;

detect a transition to the first execution mode by the guest OS;

write, into the memory buffer referenced by the entry point of the VM function, a code that aborts execution of the VM function; and disable execution of the VM function by the guest OS in the second execution mode.

16. The computer-readable non-transitory storage medium of claim 15, wherein the executable instructions causing the processing device to enable the VM function to be executed by the guest OS in the first execution mode further comprise executable instructions causing the processing device to perform at least one of: modifying an Extended Page Table (EPT) mapping to associate the entry point of the VM function with a code module that is enabled to access an address space defined by the second address size, or modifying an Extended Page Table (EPT) mapping to allow writing into a privileged hypervisor memory.

17. The computer-readable non-transitory storage medium of claim 15, wherein the first execution mode is provided by 32-bit execution mode.

* * * * *